United States Patent Office 3,839,491
Patented Oct. 1, 1974

3,839,491
LOW VOLATILITY POLYURETHANE PREPOLYMER
Robert Gamero, Whittier, and Augusto E. Benavides, Granada Hills, Calif., assignors to Peritech International Corporation, Los Angeles, Calif.
No Drawing. Filed Dec. 14, 1972, Ser. No. 315,020
Int. Cl. C08g 22/18
U.S. Cl. 260—77.5 AT                                    6 Claims

ABSTRACT OF THE DISCLOSURE

A polyurethane prepolymer composition, which is substantially free of volatile arylene diisocyanate, comprises the reaction product made from an arylene diisocyanate, an aliphatic trifunctional polyol composition, and an aliphatic diisocyanate. In the prepolymer, the (arylene diisocyanate)/(trifunctional polyol) reactant concentration has a (NCO)/(OH) equivalent weight ratio of substantially 2.0, and the aliphatic diisocyanate content of the prepolymer is 10 to 60 weight percent of the product. The prepolymers form stable light colored polyurethane films and castings on further reaction with polyols.

BACKGROUND OF THE INVENTION

(1) Field of the Invention

This invention relates to polyurethane prepolymer compositions and a process for their manufacture.

(2) Description of the Prior art

U.S. Pat. 3,554,962, granted Jan. 12, 1971, reviews the state of the art concerning polyurethane prepolymers. The patent lists earlier patents and publications of the prior art. Further, U.S. Pat. 3,549,569 specifically relates to the composition of liquid polyurethane prepolymers. McElroy and Visser in U.S. 3,218,348, issued Nov. 16, 1965 also relate to polyurethane prepolymers. In U.S. Pat. 3,483,150, issued Dec. 9, 1969, polyurethane prepolymers and elastomers are taught. An object of this invention is to provide a polyurethane prepolymer having a very low vapor pressure. Another object is to provide a process for and prepolymers suitable for industrial coatings and casting applications. A further object of this invention is to provide light colored prepolymers which can be converted into light colored castings and coatings, which are resistant to the discoloration on prolonged exposure to light.

SUMMARY OF THE INVENTION

A polyurethane prepolymer composition is taught comprising the reaction product made from (a) an arylene diisocyanate (b) an aliphatic trifunctional polyol composition, containing a polyoxypropylene diol ranging in molecular weight from 400 to 2000 and a polyoxypropylene triol ranging in molecular weight from 300 to 1500, the diol ranging in concentration from 90 to 40 weight percent and the triol conversely ranging in concentration from 10 to 60 weight percent, and (c) and aliphatic diisocyanate. The (arylene diisocyanate)/(trifunctional polyol composition) reactants have an (NCO)/(OH) equivalent weight ratio of substantially 2.0. The aliphatic diisocyanate comprises 10 to 60 final weight percent of the reaction product. A process of preparing a polyurethane prepolymer is taught comprising exothermally reacting an arylene diisocyanate with a polyoxypropylene triol at an (NCO)/(OH) equivalent weight ratio ranging from 1.6/0.1 to 2.25/0.6 providing a reaction mass temperature rise not substantially exceeding 72° C. In a second stage, the reaction is maintained at a temperature range of 82 to 93° C. for a time period required to react additional polyoxylpropylene diol in an amount providing an (NCO)/(OH) of 2.0/1.0 with the remaining arylene diisocyanate, then subsequently adding an aliphatic diisocyanate in an amount to provide a prepolymer having 10 to 60 weight percent of aforesaid selected aliphatic diisocyanate.

DESCRIPTION OF THE PREFERRED EMBODIMENTS

The production of polyurethane prepolymers and elastomers is well known, utilizing the reactions of arylene diisocyanates, and tolylene diisocyanate in particular. The arylene diisocyanates, specifically tolylene diisocyanate, have relatively high vapor pressure values and volatilize into the air during commercial applications. Tolylene diisocyanate is toxic and is irritating in either its liquid or vapor form. Prolonged breathing of its vapors and contact with the skin and eyes causes irritation, burns and produces difficult and labored breathing in some individuals. Urethane prepolymers and elastomers have been prepared by omitting or reducing the amounts of tolylene diisocyanate and reacting low viscosity or solid polyfunctional isocyanates derived from the reaction of aniline and formaldehyde, and at least one polyfunctional compound containing active hydrogen groups. Other polyfunctional isocyanates are also employed in the prior art, containing functionality between 2 and 3. Many of these systems have very poor color clarity and high viscosity characteristics.

The polyurethane prepolymers of this invention utilize aliphatic diisocyanates, which specifically include linear, cyclic and branched aliphatic diisocyanates. Methylene-bis-(hexyl diisocyanate) is the preferred aliphatic diisocyanate and other aliphatic diisocyanates can be used as equivalents. These aliphatic diisocyanates comprise from 10 to 60 weight percent of the prepolymer product composition. Tolylene diisocyanate, including its several isomers, is also used in these prepolymer product compositions and is the preferred arylene diisocyanate. Combinations of aliphatic diisocyanates with polyfunctional isocyanates such as polymethyl, polyphenyl isocyanate, and solid polyfunctional diisocyanates such as diphenyl methane diisocyanates may also be used to make useful polyurethane prepolymers.

The invention is illustrated by the following examples in which the compositions are expressed in parts by weight, and in the equivalent weights as indicated.

EXAMPLE I

This prepolymer is the product of the reaction of mixed polyoxypropylene polyols of different functionalities with 2, 4-tolylene diisocyanate and a polycyclic aliphatic diisocyanate methylene-bis-(hexyl diisocyanate). Due to the use of 2, 4-tolylene diisocyanate, the probability of ending with free monomeric tolylene diisocyanate in the finished prepolymer is minimized, due to the difference in rates of reaction between the -meta and -para position isocyanate (NCO) groups.

The prepolymer product is formed by charging 2, 4-tolylene diisocyanate into a reaciton vessel and adding slowly and with good agitation a trifunctional polyoxypropylene triol derivative based on trimethylol propane and propylene oxide, with a molecular weight ranging from 300 to 600. The mass is allowed to react exothermically without the application of external heat to a temperature not substantially exceeding 72° C. Subsequently, a difunctional polyoxypropylene diol is added and the mixture is maintained in the range of 82–93° C. and held at that temperature range for one (1) hour. As a last step, methylene-bis-(hexyl diisocyanate) is added while stirring and the mixture is kept at a temperature of 82–93° C. for an additional hour.

The viscosity of the cooled final prepolymer product when measured with a Brookfield Model RVF Viscometer at 21° C. with Spindle 2 at 20 r.p.m. is approximately 700 cps. It is an almost colorless liquid and exhibits excellent non-yellowing properties.

Reactant amounts used in the preparation of the prepolymer product described as Example I are as follows in Table A:

TABLE A

| Reactants | Parts by wt. | Reactive equivalent weights [1] |
|---|---|---|
| Tolylene diisocyanate (or 2,4 or 80/20 isomer) | 174 | 2.02 |
| Polyoxypropylene diol (M.W. 1,000 approx.) | 324 | 0.644 |
| Trifunctional polyoxypropylene triol (M.W. 400 approx.) | 55.8 | 0.420 |
| Methylene-bis-(hexyl diisocyanate) | 417 | 2.06 |

[1] The reactive equivalent weights are based on the weight required for one reactive (OH) and (NCO) group.

Table C lists the reactants and the quantities of the reactants which enter into the formation of the prepolymer composition products of Examples II through IX. Some of the properties of the reactant compositions are listed below the respective examples in the Table.

The temperature ranges of the process disclosed under Example I are important in assuring the optimum completion of the reaction producing the prepolymer product. The temperatures are consistent with reasonable practical production procedures. Conversely, if the process is operated at higher temperature ranges, there is a possibility of product gelation and the undesirable formation of allophanates.

The vapor pressure at 20° C. of the various diisocyanates used are as follows in Table B:

Table B

| | MM. |
|---|---|
| Tolylene diisocyanate (TDI) | 0.01 |
| Isophorone diisocyanate (IPDI) | 0.0003 |
| Trimethyl hexamethylene diisocyanate (TMDI) | 0.0007 |
| Methylene bis hexyl diisocyanate (MHDI) | 0.0002 |
| Xylylene diisocyanate (XDI) | 0.0008 |
| Hexamethylene diisocyanate (HMDI) | 0.0002 | below were obtained, indicating that the tolylene diisocyanate was only slightly vaporized due to its higher vapor pressure.

Percent (NCO) of prepolymer _____ 19.7
Percent free (TDI) in prepolymer _____ 0.8

In order to compare the relative stability of coatings prepared from the prepolymer products, separate portions of the listed examples of Table C were reacted with mixtures of polyoxypropylene diols and polyoxypropylene triols in the molecular weight range of 4000. The films were cured for 7 days at 21° C. The cured films were subjected to continuous exposure in a Fade-Ometer at 52° C. and 32% relative humidity for 200 hours. The yellowing index on the films was measured before and after exposure, using a colorimeter. The increase in the yellowing index is listed in Table D.

TABLE D

| Urethane sample | Yellowing index | Remarks |
|---|---|---|
| TDI—triol 422—diol 425 | 24 | An aromatic polyurethane. |
| TDI—triol 422—diol 763 | 26 | Do. |
| X-TDI[a]—triol 422—diol 425 | 8 | Similar to Example I. |
| X-TDI[a]—triol 422—diol 763 | 6 | Do. |

[a] X-TDI is a 50/50 mixture of XDI and TDI, based on equivalents.

The typical properties of a polyurethane prepared from a prepolymer product of Example I and cured with a mixture of polyols is listed in Table E.

TABLE E

| Physical Properties: | Test Results |
|---|---|
| Color | Clear, water-white. |
| Hardness (Shore "A") | 90±5. |
| Tensile Strength (p.s.i.) | 1100. |
| Elongation (percent) | 300. |
| Tear Strength (p.s.i.) | 125. |
| Specific Gravity | 1.097. |
| Viscosity (Brookfield, RVF): | |
| Part A (cps.) | 1000. |
| Part B (cps.) | 230. |

TABLE C

| Reactants (parts by weight): | Example number | | | | | | | |
|---|---|---|---|---|---|---|---|---|
| | II | III | IV | V | VI | VII | VIII | IX |
| Tolylene diisocyanate (2,4 or 8/20 isomer) (TDI) | 174 | 174 | 174 | 174 | 174 | 174 | 174 | 174 |
| Trifunctional polyoxypropylene triol (M.W. 1,500 approx.) | 515 | | | 515 | | | 515 | |
| Methylene bis (hexyl diisocyanate)(MHDI) | 809 | 350 | | | | | | |
| Trifunctional polyoxypropylene triol (M.W. 700 approx.) | | 243 | | | 243 | | | 243 |
| Polyoxypropylene diol (M.W. 1,000 approx.) | | | 323 | | | 323 | | |
| Trifunctional polyoxypropylene triol (M.W. 400 approx.) | | | 56 | | | 56 | | |
| Isophorone diisocyanate (IPDI) | | | 386 | 413 | 167 | | | |
| Trimethyl hexamethylene diisocyanate (2,2,4 or 2,4,4 isomer) (TMDI) | | | | | | 263 | 273 | 151 |
| Viscosity (cps. at 21° C.) | 5,050 | 16,000 | 900 | 8,000 | 18,000 | 600 | 4,000 | 14,000 |
| Percent NCO (theoretical) | 20 | 20 | 20 | 22 | 18 | 18 | 15 | 18 |
| Percent free TDI (theoretical) | 0 | 0 | 0 | 0 | 0 | 0 | 0 | 0 |
| Color (Gardner scale) | <1 | <1 | <1 | <1 | <1 | <1 | <1 | <1 |
| Isocyanate equivalent weight | 210 | 210 | 210 | 190 | 234 | 234 | 267 | 234 |
| Wt. percent aliphatic diisocyanate | 54 | 45.7 | 41.1 | 37.6 | 28.7 | 32.2 | 28.4 | 26.3 |

Colorimetric determinations of the atmospheric concentration of free tolylene diisocyanate in the air were conducted daily over a year period during the manufacture of a product which contained only a tolylene diisocyanate. The concentration measurements of the diisocyanate range from 0.01 to 0.08 parts per million in the ambient air. Colorimetric determinations conducted on prepolymer products of Examples I–IX show zero or minute traces on the colorimetric scale. An exact value is difficult to measure, since the colorimetric change is so minute and is of the order of 0.001 to 0.005 parts per million in the air. The colorimetric determinations were conducted using a constant volume of air flow per minute.

An evaluation was made using the distillation technique as required by ASTM D2615–67T, which tests the vaporization of a prepolymer product. Utilizing the prepolymer product of Example I, the following values TABLE E—Continued Water Immersion:
  (Percent gain—10 days at
    21° C.) _____ 1.45.
Hydrolytic Stability (Shore "A"
  change):
    3 weeks 95% RH at 21°
      C. _____ −10.
    3 weeks 80% RH at 82°
      C. _____ −25.
Fungus Resistance _____ Non-nutrient.
Electrical Properties:
  Insulation Resistance (ohms) __ $1 \times 10^{12}$.
  Volume Resistivity (ohms-cm.) $3.8 \times 10^{13}$.
  Surface Resistivity (ohms) __ $2.3 \times 10^{13}$.
  Dielectric Strength (V/mil) __ 450.
  Dielectric Constant ($10^3$, Hz.) __ 4.1.
  Dissipation Factor ($10^3$, Hz.) __ 0.07.

The times required to react the polyurethane prepolymer product Example I when reacted with a mixture of polyols and a lead octoate catalyst (0.05 weight percent), is a function of the mass, temperature and catalyst used. The data of Table F indicates the time required to react at specific polyurethane preparation temperatures.

TABLE F

| Mass (g.) | Reaction curing time (min.) at— | | |
|---|---|---|---|
| | 4° C. | 21° C. | 32° C. |
| 500 | 23 | 13 | 9 |
| 125 | 25 | 15 | 13 |
| 65 | 27 | 17 | 15 |

Obviously in the light of the teaching many modifications and variations in the polyurethane prepolymer reaction products of this invention can be made, together with variations in the process for manufacturing the products.

While the particular low volatility polyurethane prepolymer herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

We claim:

1. A process for preparing a polyurethane prepolymer composition comprising: exothermically reacting an arylene diisocyanate with a polyoxypropylene polyol at an (NCO)/(OH) equivalent weight ratio range of substantially 1.6/1.0 to 2.25/0.06, providing a reaction mass temperature rise not substantially exceeding 72° C.; subsequently reacting in a second stage a polyoxypropylene glycol in an amount providing an (NCO)/(OH) equivalent weight ratio of substantially 2.0/1.0 in a temperature range of 82 to 93° C. for a time period required to react with all free remaining arylene diisocyanate; subsequently adding an aliphatic diisocyanate in an amount to provide a prepolymer having 10 to 60 weight percent of aforesaid selected diisocyanate, providing an isocyanate terminated prepolymer composition substantially free of volatile arylene diisocyanate.

2. A polyurethane prepolymer composition consisting essentially of the reaction product of:
   (a) arylene diisocyanate;
   (b)(i) polyoxypropylene diol of molecular weight from about 400 to about 2000, and
      (ii) polyoxypropylene triol of molecular weight from about 300 to about 1500,
      (iii) the diol/triol weight relationship being from about 90/10 to about 40/60;
   (c) the equivalent weight ratio of NCO groups in said arylene diisocyanate reactant to the OH groups in said diol-triol reactant being substantially 2.0; and
   (d)(i) aliphatic diisocyanate, cycloaliphatic diisocyanate, or mixtures thereof,
      (ii) said diisocyanate of (d)(i) being present in an amount to provide a reaction product having about 10 to 60 weight percent of said diisocyanate of (d)(i),
   which reaction is an isocyanate-terminated prepolymer substantially free of non-reacted arylene diisocyanate.

3. The prepolymer composition of claim 2 wherein said diisocyanate of (d)(i) is selected from the group consisting of isophorone diisocyanate, trimethylhexamethylene diisocyanate, hexamethylene diisocyanate, and polycyclic aliphatic methylene-bis-(hexyl diisocyanate).

4. The prepolymer composition of claim 2 wherein said arylene diisocyanate is tolylene diisocyanate.

5. The prepolymer composition of claim 2 wherein said aliphatic diisocyanate is polycyclic aliphatic methylene-bis-(hexyl diisocyanate).

6. The prepolymer composition of claim 2 wherein said isocyanate-terminated prepolymer reaction product has a free NCO group content of about 15–22 weight percent.

References Cited
UNITED STATES PATENTS

| 3,549,569 | 12/1970 | Farah et al. | 260—18 TN |
| 3,554,962 | 1/1971 | Fischer | 260—77.5 AT |
| 3,218,348 | 11/1965 | McElroy et al. | 260—31.2 N |

M. J. WELSH, Primary Examiner

U.S. Cl. X.R.

260—77.5 AP